United States Patent
Lochbrunner

[19]

[11] Patent Number: 6,016,903

[45] Date of Patent: Jan. 25, 2000

[54] CONVEYOR TRACK FOR PALLETS

[75] Inventor: Johann Lochbrunner, Neu-Ulm, Germany

[73] Assignee: Grob-Werke GmbH & Co. KG, Mindelheim, Germany

[21] Appl. No.: 08/738,603

[22] Filed: Oct. 29, 1996

[30] Foreign Application Priority Data

| Oct. 30, 1995 | [DE] | Germany | 195 40 381 |
| Nov. 22, 1995 | [DE] | Germany | 195 43 437 |
| Dec. 15, 1995 | [DE] | Germany | 195 46 887 |

[51] Int. Cl.⁷ .................................................. B65G 47/46
[52] U.S. Cl. .................................. 198/370.1; 198/779
[58] Field of Search .............................. 198/367, 370.08, 198/370.09, 370.1, 465.1, 779

[56] References Cited

U.S. PATENT DOCUMENTS

| 2,829,762 | 4/1958 | Oswald | 198/779 |
| 3,104,004 | 9/1963 | Poel et al. | 198/367 |
| 3,291,279 | 12/1966 | De Good et al. | 198/779 |
| 5,743,375 | 4/1998 | Shyr et al. | 198/370.1 |

*Primary Examiner*—Joseph E. Valenza
*Attorney, Agent, or Firm*—Jacobson, Price, Holman & Stern, PLLC

[57] ABSTRACT

A conveyor track for pallets, in particular for pallets which transport workpieces, comprises a primary conveyor track (2) and a secondary conveyor track (21). A pallet (1.0) is driven along the primary conveyor track (2) by firs drive means and along the secondary conveyor track by second drive means. The transfer operation between the two drive means is carried out by the second drive means automatically lifting the pallet (10) from the first drive means and transporting it on.

4 Claims, 7 Drawing Sheets

CONVEYOR TRACK FOR PALLETS

BACKGROUND OF THE INVENTION

The invention relates to a conveyor track for pallets, in particular for transporting workpieces, the pallet being driven by a first drive means.

Conveyor tracks as described above are used, for example, in transfer lines for transporting workpieces mounted on the pallets between various machining stations. The workpieces, for example engine blocks, are fastened to the pallet and the pallet is transported, together with the workpiece, along a primary conveyor track to various machine tools having different functions. The machining stations are connected to the primary conveyor track by, for example, short secondary conveyor tracks. A control system ensures that the workpieces to be machined are allocated to the correct machining stations. For feeding-in and diverting the pallet from the primary conveyor track to the secondary conveyor track, it is generally necessary to lead the pallet away at right angles to the main conveying direction.

To this end, it is known to divert or transfer the pallets or similar carrying elements laterally, firstly by lifting them using an additional lifter and then placing them by means of the latter onto another, second transport system or conveying means which then conveys the pallets away. In this procedure, two movement operations are therefore necessary, which is correspondingly costly.

The invention has the object of improving a conveying path as described above, such that the pallet is transferred from one drive means to another drive means without the need for the costly transfer apparatus.

BRIEF SUMMARY OF THE INVENTION

To achieve this object, the invention on proposes further development of a conveyor track as described above such that a second drive means takes over the pallet, the second drive means lifting the pallet from the first drive means and then driving the pallet.

Through the lifting of the pallet, the pallet is freed from the first drive means. At the same time, the second drive means convoys the lifted pallet further.

The problems outlined above, involving costly constructions of a lifting mechanism and the like, are eliminated by this solution. The drive means thus fulfils two functions, of lifting and transporting. The second drive means may grasp the pallet from below, from the side or from above.

DETAILED DESCRIPTION OF PREFERRED EMBODIMENTS

Figure 1A:
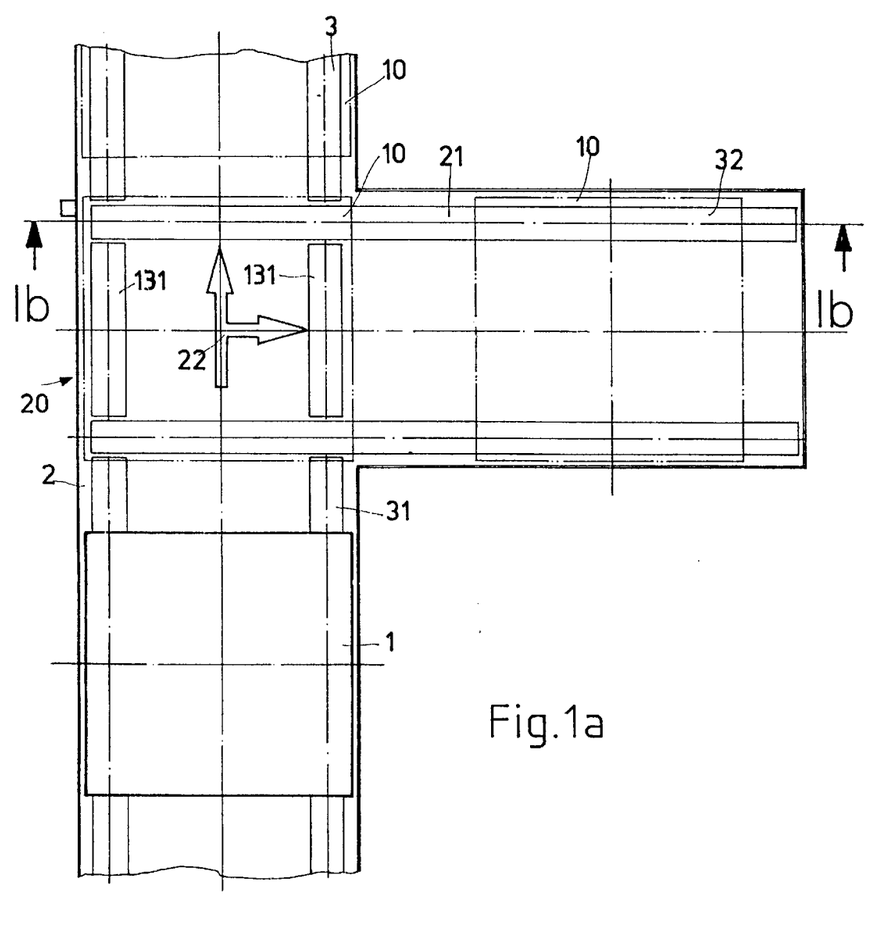
FIGS. 1a, 1b, 2a, 2b, 3a and 3b show various positions of the pallet on the conveyor track, (a) in plan view, and (b) in vertical section along each of the marked lines.
Figure 1B:
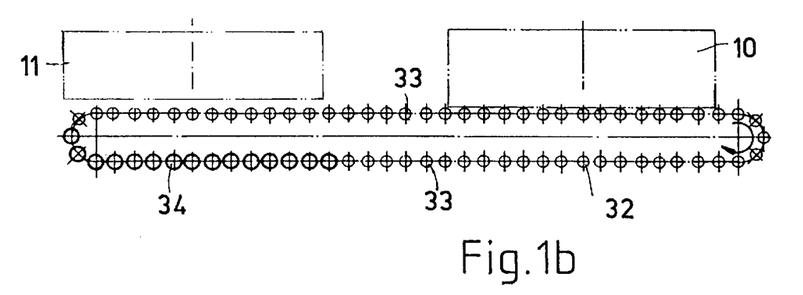
Figure 2A:
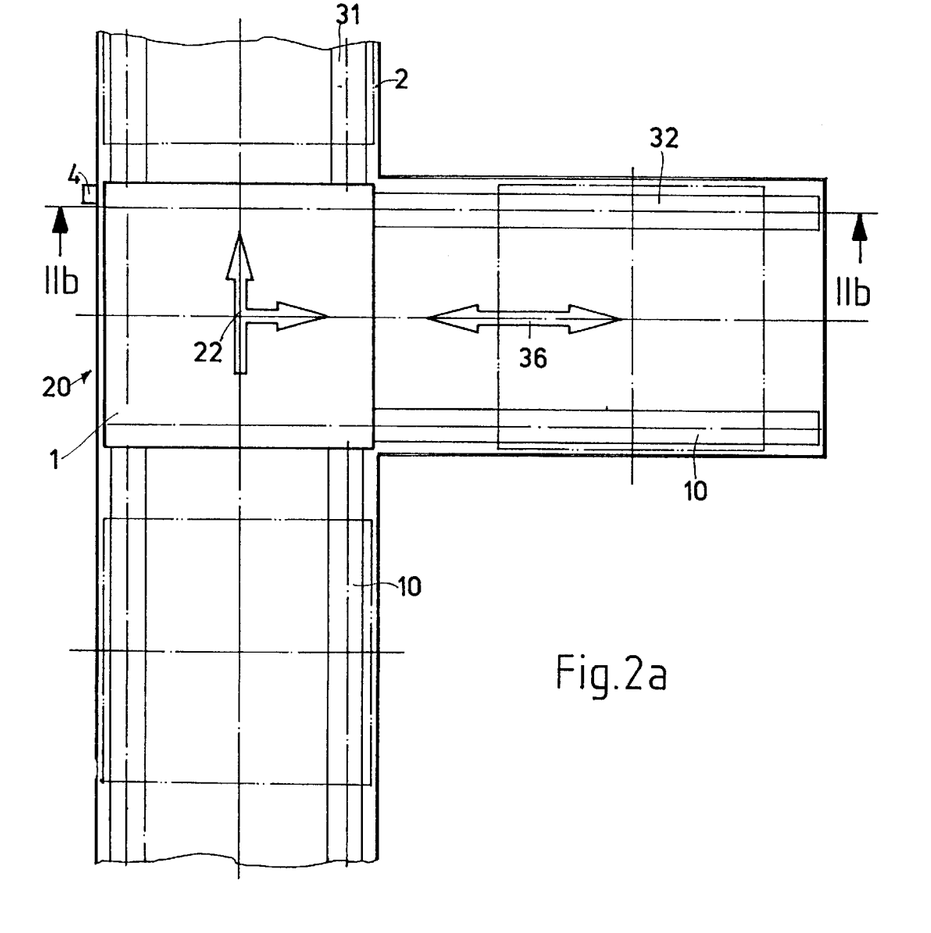
Figure 2B:
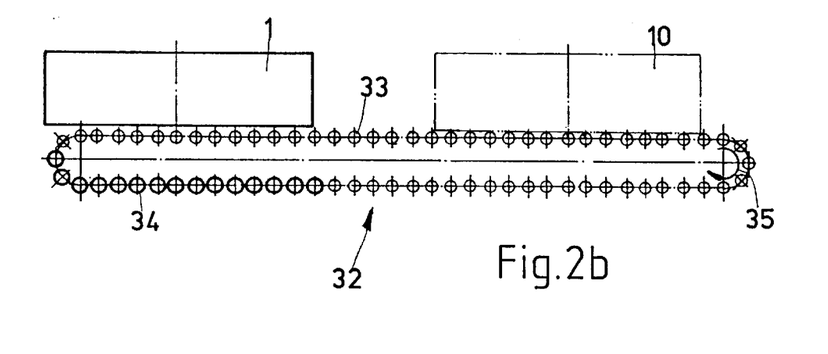
Figure 3A:
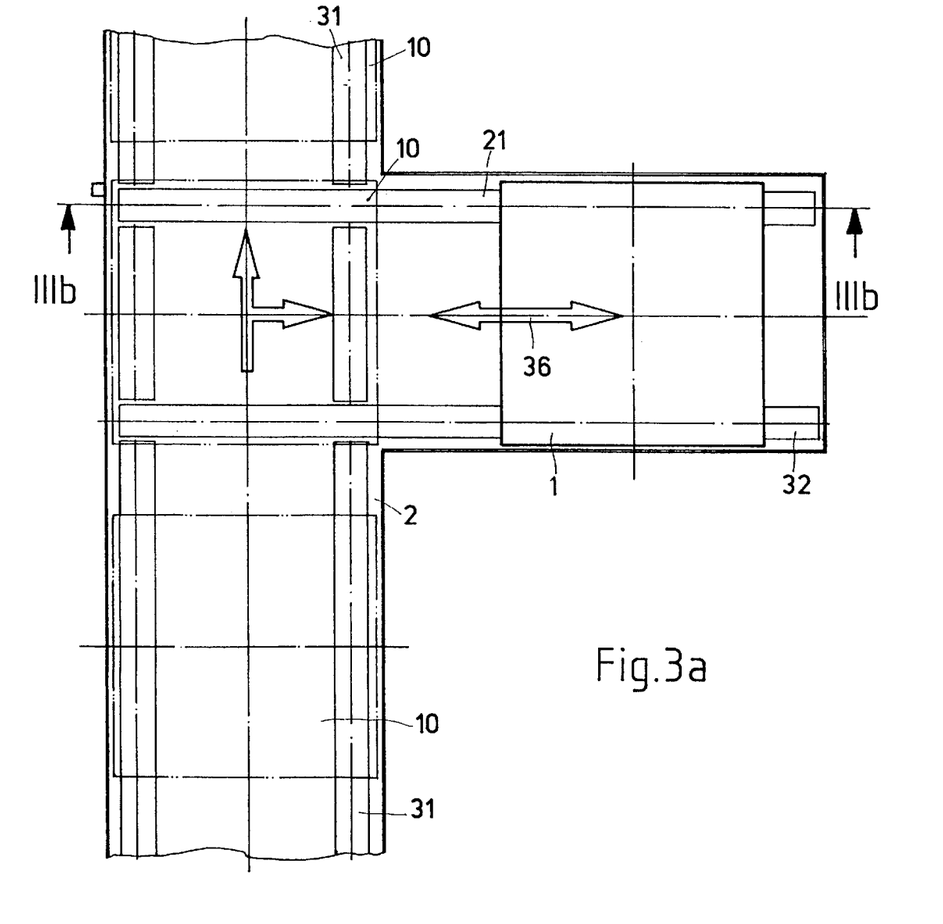
Figure 3B:
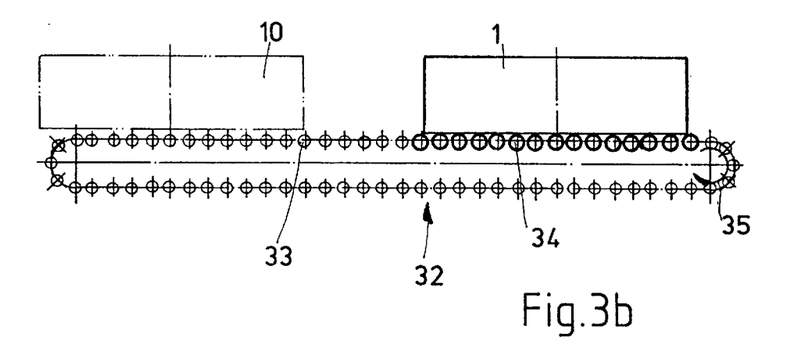

In FIGS. 1, 2 and 3, various stages of the diversion of a pallet 1 on the conveyor track 2 are represented diagrammatically in various representations, in plan view (a) and in vertical section (b) In FIG. 1a, the pallet 1 to be diverted is drawn in heavier lines, while other pallets 10 on the conveying path 2 are marked in broken lines. The pallet 1 is to be diverted from the main conveyor track path 2 onto a secondary conveyor track 21 in the region of the points 20, in order to supply the workpiece provided on the pallet 1 to a place where it is subjected to a special machining operation. The branching possibility in the region of the points 20 is marked by the arrows 22.

As drive means 3 in the direction of the conveyor track 2 there is provided, for example, an endless circulating friction-roller chain. The drive means of the conveyor track 2 is denoted here as first drive means 31. The second drive means of the secondary conveyor track 21 is denoted here by 32.

FIG. 1b shows, in a vertical sectional representation, the pallots 10,11 lying on the second drive means 32. The drive means 32 in this embodiment is likewise in the form of a friction-roller chain. To this end, a multiplicity of friction rollers 33 are provided. In FIG. 1b, it is indicated that some of the friction rollers 34 have a greater diameter than the friction rollers 33. These friction rollers 34 are shown in the drawing in heavier lines. Of the pallets 10 lying on the drive means 32, only the one on the right is actually lying on the drive means. The pallet 11 on the left is not supported by the rollers 33. This pallet is still lying on the first drive means 31 of the main conveyor track 2, or on the slide track or conveyor track parts 131 which adjoin the drive means 31. Nor are the friction rollers 34 having the greater diameter in contact with the pallet 11, as indicated in FIG. 1b. The pallet 11 is therefore not yet being conveyed by the second drive means 32 onto the secondary conveyor track 21 either. The second drive means 32 is in a waiting position such that, when required, the part of the friction-roller chain having the larger friction rollers 34 can immediately be moved under the pallet 11 in order to lift it.

FIGS. 2a, 2b show that the pallet 1 which is to be diverted onto the secondary track 21 has come into the points 20. A sensor 4 provided on the conveying path 2 detects the pallet 1 which has arrived and causes the pallet 1 to be stopped. To this end, a stop, for example, may be swung into the conveyor track 2 and stop the pallet 1 without, however, influencing the conveying movement of the first drive means 31. Consequently, only the pallet 1 is stopped but not the pallets 10, which continue to move on the conveyor track 2. Nevertheless, it is also possible to stop the drive means 31. The pallet 1 which has arrived lies on the first drive means 31, or on the part 131. This can also be seen in FIG. 2b, since here the smaller friction rollers 33 are not in contact with the underside of the pallet.

The sensor 4 is connected to a conveyor track control system (not shown specifically). This conveyor track control system now switches on the drive for the second drive means 32. This is shown in FIGS. 3a, 3b. The conveying means 32 is driven here in the clockwise direction (arrow 35), for example, by an electric motor. Nevertheless, the pallet 1 can also be displaced forwards and backwards (indicated by the arrow 36) on the conveying means 32. If now the conveyor track control system causes the second drive means 32 to start up, the friction rollers 34 having the greater diameter travel under the pallet 1. The lower side of the pallet 1 comes into contact with the periphery of the friction rollors 34 and is lifted by the friction rollers 34. Through the further conveying movement of the drive means 32, the pallet 1 is, as shown in FIG. 3b, displaced to the right along the arrow 36.

At the same time, there may be provision by the control system for the following pallet 10 to be brought into the points 20.

In order to make the second drive means 32 available again for the lifting of the newly arrived pallet 10, there is provision for the conveying means 32, for example, to pass on the lifted pallet 1 after a short distance to a further following drive means in order then to return again to the starting position shown in FIGS. 1a, 1b. Thus, there may be provision for the pallet 1 then to travel, for example, against a stop, for the friction rollers 34 under the pallet to slide on and, when the region with the smaller rollers 33 follows, for the pallet 1 to be set down onto the downstream drive means. The appropiate control for the setting-down movement or passing-on of the pallet to following drive means etc. is also provided by the conveyor track control system.

The conveyor track according to the invention is so simple because only one simple conveying movement is necessary, which automatically effects the lifting when the conveying section having the greater height comes into contact with the pallet.

The feeding-in of a pallet which is being conveyed back from the secondary conveying path 21 onto the main conveying path 2 takes place in reverse steps.

Figure 4:
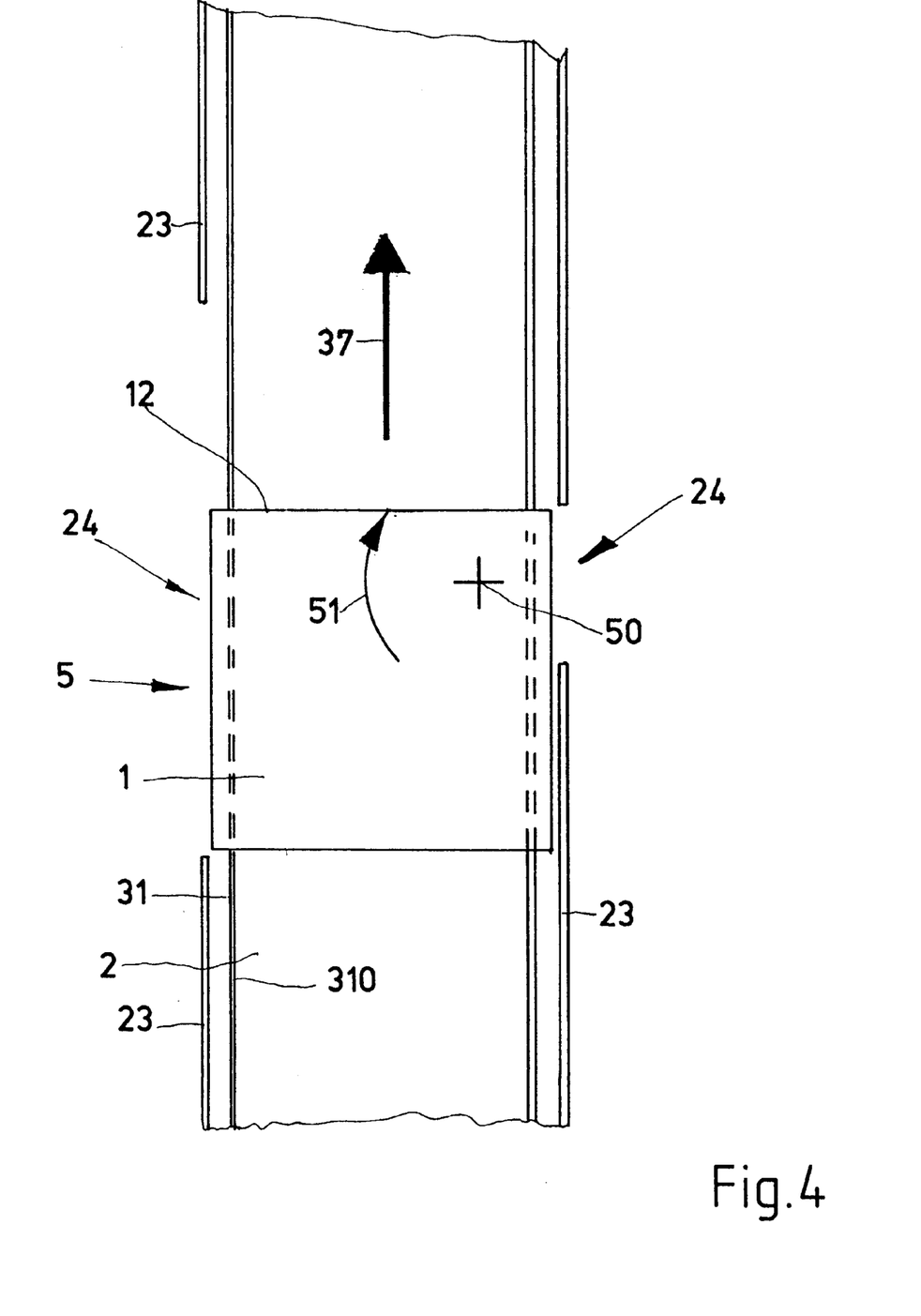
FIG. 4 shows, in plan view, the slewing apparatus of the conveyor track according to the invention, FIG. 5 show a section through the friction-roller chain of the rule conveyor track according to the invention.

FIG. 4, the slewing apparatus 5 is shown. The slewing apparatus 5 is used to turn the pallet 1, for example, through 90°. The slewing ensures that the front side 12, which, as indicated in this example, is oriented in the transporting direction, is also aligned in the transporting direction again after a lateral displacement. As a result, the orientation of the workpiece on the pallet is always the same in relation to the transporting direction. For the slewing of the pallet 1, the slewing apparatus is provided on the conveyor track 2, for example, at a distance upstream of points. The conveyor track 2 has, in its lateral guide strips 23, interruptions 24 which serve to accommodate the swung-out regions of the pallet 1. The pallet 1 is slowed about a slewing axis 50. The slewing axis 50 may, for example, be in the form of a bolt or pin which is vertically movable and is arranged, for example, on the conveyor track 2 or on the pallet 1. Accordingly, the slewing axis 50 engages in an opening of the conveyor track or of the pallet in order to fix this point of the pallet in relation to the conveyor track. The slewing movement of the pallet is effected by the first drive means 31. The drive means 31 are, for example, arranged in pairs on both sides of the conveyor track 2. If now, for example, on the side which is on the right in the conveying direction the pallet is held firmly by the slewing axis 50, the left-hand drive means 310 is still able to move the pallet 1 on. This results in a slewing or turning movement 51 of the pallet about the slewing axis 50. During this, the right-hand drive means slides through under the pallet. The slewing movement may be limited, for example, by an appropriate sensor control. It is, however, also possible to release the firm holding of the pallet 1 on the conveyor track 2 by the slewing axis 50 again when the slewed pallet rests against the guide strip 23 which is on the right (in the conveying direction 37).

If now there follows, for example downstream of this slewing apparatus, a displacement of the pallet at right angles, for example in order to travel around a corner, the side 12 again forms the front side of the pallet downstream of the corner. It is even possible, by connecting a plurality of the same slewing apparatuses one after the other, to turn the pallet through 270°, corresponding to a single turn through 90° in the other direction. There may also be provision for the slewing apparatus to be provided directly upstream of points and for the slewed pallet to be convoyed onto the points.

Figure 5:
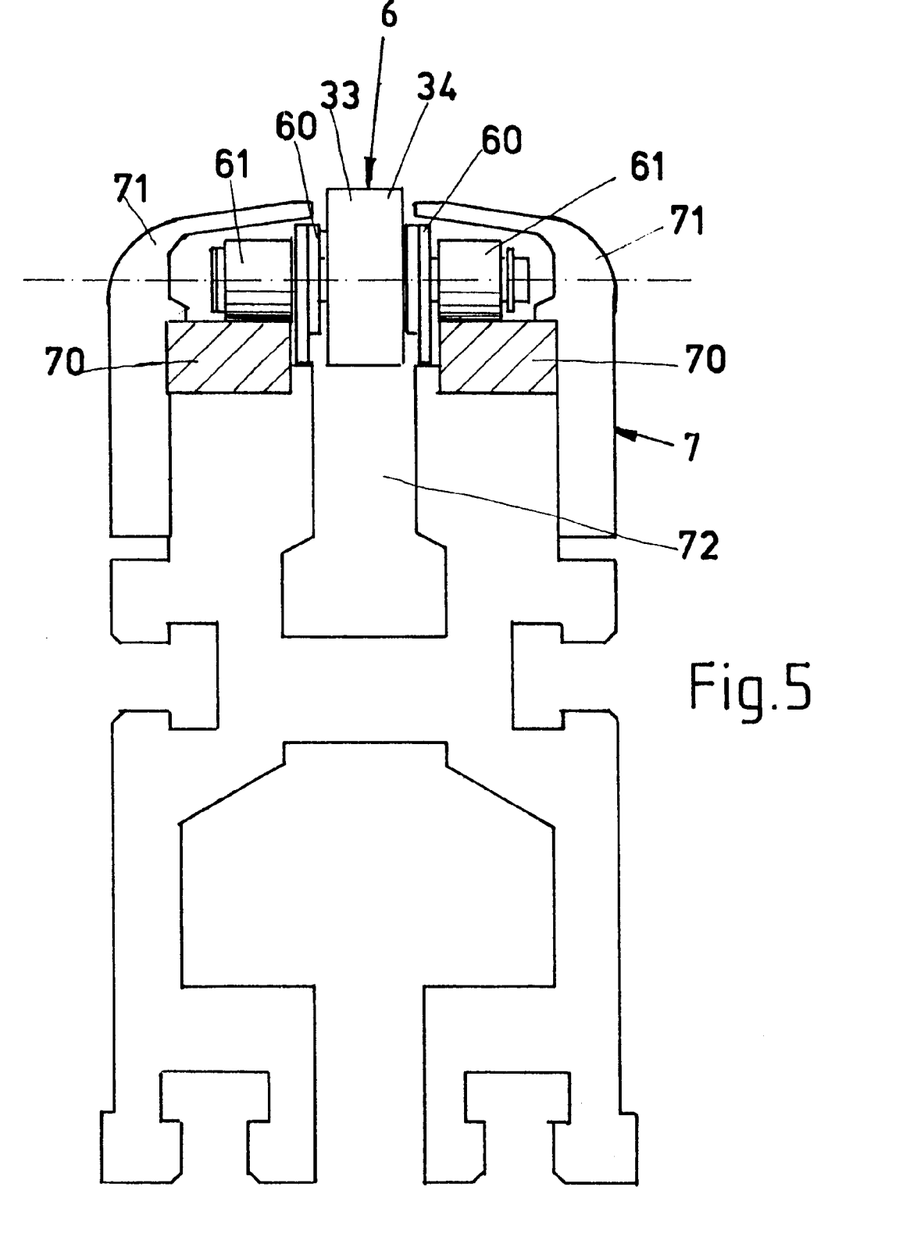

In FIG. 5, the construction for the mounting of the pallets on the drive means, the friction-roller chains, is shown in elevation. The friction-roller chain is denoted by 6. The chain 60 is supported by means of rollers, for example pairs 61 of rollers, on the outside of the link plates on a base 70. The link plates 60 carry rollers 33, 34 having different diameters. The rollers 34 serve, for their part, in turn as a support for the pallets. In particular the rollers 34 of greater diameter are designed as friction rollers, that is to say turning is only possible against a frictional resistance. To this end, a coupling, for example a slip clutch, friction clutch or the like, is provided between support rollers 33,34 and the supporting rollers 61. As a result, it is possible for the pallets to be taken along by the friction-roller chain, but the pallets which are retained by a stop do not hinder the operation of the drive means.

The base 70 is situated in a profile 7. The profile 7 has aprons 71 which cover the rollers 61, with the result that direct contact with the rotating rollers 61 is avoided. The profile 7 has a recess 72 into which the bearing rollers 33,34 project.

Figure 6:
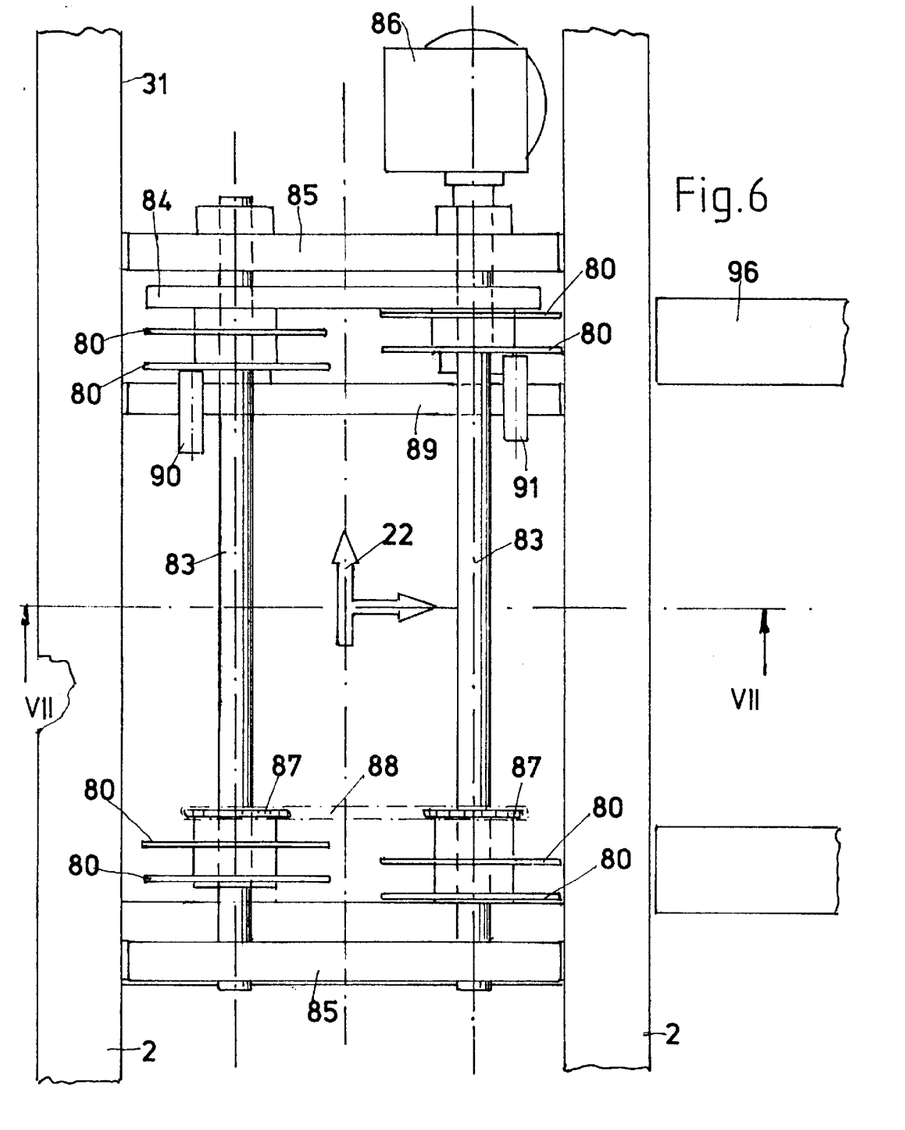
FIG. 6 shows a plan view of a modified exemplary embodiment of the invention and FIG. 7 shows a section through the representation of FIG. 6 on the line VII—VII.
Figure 7:
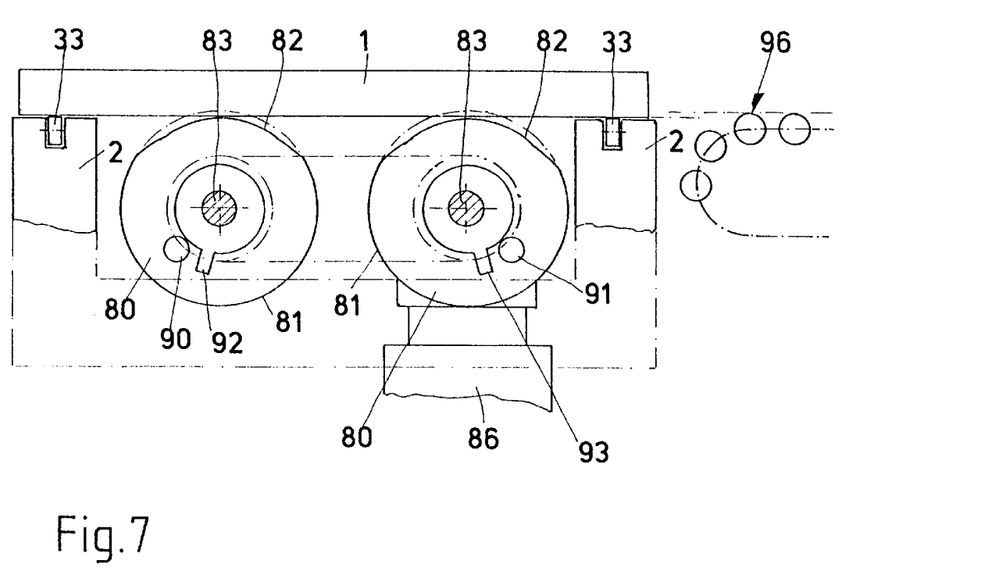

In FIGS. 6 and 7, a modified embodiment of the invention is shown. Whereas in the exemplary embodiments of FIGS. 1 to 5 friction-roller chains having friction rollers at different sizes were always used, the embodiment according to FIGS. 6 and 7 concerns a construction in which the second conveying means is formed by motor-driven, rotatable discs 80 or cylinders, which are eccentrically arranged.

FIG. 6, which shows a plan view, reveals that between the two parts of the conveyor track 2 there are mounted two shafts 83 which extend parallel to the conveying direction of the conveyor track 2. Although the parallel alignment of the shafts 83 with respect to the conveying direction of the first conveying means is advantageous for the invention, it is not absolutely necessary. In the case where the pallets are to be diverted not at right angles but at an acute angle, the alignment of the shafts 83 is to be adapted accordingly.

The shafts 83 are carried by bearing crosspieces 85, and one of the two shafts is driven by a motor 86. Fastened to both shafts are, for example, toothed rings 87, and a circulating chain 88 ensures that, when being acted upon by the motor, both shafts rotate in the same direction.

Discs 80 are arranged on both shafts, in pairs in each case, the form of which is apparent in particular from the representation of FIG. 7 and is described in greater detail below. As can be seen, pairs of discs are provided in each case at the two ends of the shafts 83, the spacings being adapted to the size of the support surface of the pallest 1, so that the pallets are supported in each case at the front and rear end.

In the embodiment shown in FIGS. 6 and 7, discs 80 are shown in each case. However, the discs could also be replaced by cylinders which extend, for example, over a substantial part of the length of the shafts 83. The use of discs is preferable, however.

As is apparent from the representation of FIG. 6, the discs 80 of the two shafts 83 are mutually offset. The discs could also be arranged at the same level. The offset arrangement has the advantage, however, that, if required, the discs can be dimensioned with such a size that the discs partially intermesh.

Mounted on the bridge 89 are, furthermore, controllable stops 90 and 91 which cooperate with counterstops 92 and 93 on the shafts 83 or discs 80, as is apparent in particular from FIG. 7.

In FIG. 7, can be seen that the discs 80 each have an eccentric form. Peripheral regions 81 having a slightly greater diameter and peripheral regions 82 having a slightly smaller diameter are provided, the said regions following each other.

It is clear that when the stationary discs 80 occupy a position as shown, for example, in FIG. 7, the discs 80 are not in contact with the pallet 1, rather the peripheral region 82 is at a distance from these pallets 1. The pallets, which are being moved on the conveyor track 2, i.e. from the bottom upwards in the representation of FIG. 6, thus do not come into contact with the discs 80.

If now a pallet is to be diverted from the conveyor track 2, the pallet in question is firstly stopped by a stop. This many be a stop which is moved by additional control means. The stop 84 which is driven by the shafts 83 may, however, in particular also be used for this purpose. The drive of the stop 84, which can he lifted and lowered, is not shown specifically in the drawing. The stop may, for example, be moved by a cam, a cog or by an eccentric arrangement. Other transmission means is are also possible. In particular, it is also possible to control the stop 84 by auxiliary means, for example electromagnets or the like.

The discs 80 may, for example, occupy a position in which the counterstop 93 comes to rest against the associated stop 91. In this position, for example the stopping stop 84 controlled by the shafts 83 is in an unblocking position. The discs 80 allow the pallet a clear passage in this position. If now the shafts are driven clockwise, for example until the counterstop 92 of the other shaft comes to rest against the associated controllable stop 90, although the region 82 still does not project into the path of the pallets 1, the stopping stop 84 is already lifted and will stop the next pallet which arrives. If now the stops 90 and, if appropriate, also the stop 91 are withdrawn and the shafts 83 are rotated further clockwise, the peripheral regions 81 of the discs 80 will lift the pallet 1, so that the latter comes free from the conveying means of the conveyor track 2. The pallet is, however, not only lifted thereby, but at the same time also moved in the direction of the arrow 95, so that the pallet can be taken hold of by the conveying means 96 which then conveys the pallet on.

In practice, it does not present ally difficulties to design the peripheral region 81 to be of such a size that a sufficient transporting distance in the direction of the arrow 95 is obtained. For example, approximately 300° to 330° of the periphery of the discs 80 may be utilized for this. Since, in the case of an arrangement in which the discs 80 intermesh, the diameter of the discs may be even greater than shown in the drawing, it is readily possible to obtain sufficient conveying distances.

As a rule, one revolution of the shafts 83 will be sufficient for a diverting operation. In special cases, the shafts for the diverting operation may also perform more than one revolution. Since the peripheral region 82 in each case leads to a setting-down of the pallets, contact with the rollers 33 can be avoided, for example, by additional supports.

In the embodiment shown, two shafts 83 are provided. The invention can also be realised with a greater number of shafts, but also with a single shaft 83. There may be provided additional means which guide the pallets and preclude undesired contact with the rollers 33. The arrangement of only a single shaft 83 having correspondingly large discs 80 is a means of increasing the conveying distance of the discs 80.

The further transporting facility 96, which takes over the pallets, may have a conventional design.

While the invention has been described in connection with what is considered to be the most practical and preferred embodiments, it is to be understood that the invention is not limited to the disclosed embodiments but, on the contrary, is intended to cover various modifications and equivalent arrangements included within the spirit and scope of the appended claims, which scope is to be accorded the broadest interpretation permissible under the law to encompass all such modifications and equivalent structures.

I claim:

1. Conveyor track for an article, comprising a primary conveyor track;

a secondary conveyor track;

first drive means for driving the article along said primary conveyor track; and second drive means for lifting the article from said first drive means and for driving the article along said secondary conveyor track;

the first drive means driving the article into a position for transferring the article to the second drive means;

the second drive means including an endless circulating chain of article supporting rollers, said chain having at least two sections joined together, each of the sections having article supporting rollers of equal diameter, with two of said at least two sections having article supporting rollers of different diameter, one of said two sections of the second drive means projecting upwardly above the other of said two sections of the second drive means, said one section of the second drive means acting on the article, to lift and move the article whereas the other section of the second drive means passes under the article during circulation of the endless chain of rollers without driving the article.

2. Conveyor track according to claim 1, wherein said primary conveyor track and said secondary conveyor track are at right angles.

3. Conveyor track according to claim 1, wherein a pallet detection sensor is provided which cooperates with a conveyor track control system, the conveyor track control system controlling said first and second drive means and controlling take-over of the pallet from said first drive means by said second drive means.

4. Conveyor track according to claim 1, wherein a portion of said second drive means extends into a path of said first drive means.

* * * * *